United States Patent [19]
Volz et al.

[11] Patent Number: 5,742,109
[45] Date of Patent: Apr. 21, 1998

[54] ELECTRIC MOTOR, PUMP AND AN ELECTRIC MOTOR/PUMP SYSTEM

[75] Inventors: Peter Volz, Darmstadt; Hans-Dieter Reinartz, Frankfurt am Main; Dieter Dinkel, Eppstein/Ts., all of Germany

[73] Assignee: ITT Automotive Europe GmbH, Germany

[21] Appl. No.: 649,642

[22] PCT Filed: Sep. 21, 1995

[86] PCT No.: PCT/EP95/03715

§ 371 Date: Jul. 10, 1996

§ 102(e) Date: Jul. 10, 1996

[87] PCT Pub. No.: WO96/09682

PCT Pub. Date: Mar. 28, 1996

[30] Foreign Application Priority Data

Sep. 23, 1994 [DE] Germany .................... 44 33 972.0

[51] Int. Cl.$^6$ ...................... H02K 5/04; H02K 5/22
[52] U.S. Cl. ...................................... 310/89; 310/91
[58] Field of Search ......................... 310/83, 87, 88, 310/89, 90, 91, 157; 417/410.1, 423.1, 423.7, 423.15, 423.11, 423.12, 423.14

[56] References Cited

U.S. PATENT DOCUMENTS

| | | | |
|---|---|---|---|
| 3,408,942 | 11/1968 | Davenport et al. | 417/423.14 |
| 3,484,934 | 12/1969 | Wightman | 29/596 |
| 4,900,967 | 2/1990 | Amano et al. | 310/91 |
| 5,263,825 | 11/1993 | Doolin | 417/423.1 |
| 5,325,736 | 7/1994 | Tsujita | 310/90 |

FOREIGN PATENT DOCUMENTS

| | | |
|---|---|---|
| 2458167 | of 0000 | France . |
| 598324 | 6/1934 | Germany . |
| 1067259 | 10/1959 | Germany . |
| 1075434 | 2/1960 | Germany . |
| 1488451 | 6/1969 | Germany . |
| 89052161 | 4/1990 | Germany . |
| 91042844 | 6/1992 | Germany . |
| 4105349 | 8/1992 | Germany . |
| 4224980 | 2/1994 | Germany . |
| 4234013 | 4/1994 | Germany . |
| 4235962 | 5/1994 | Germany . |
| 4315826 | 11/1994 | Germany . |
| 94G3230 | 6/1995 | Germany . |
| 62-89444 | 4/1987 | Japan ............ 310/88 |
| 1407631 | 9/1975 | United Kingdom . |
| WO9408830 | 4/1994 | WIPO . |

*Primary Examiner*—Clayton E. Laballe
*Attorney, Agent, or Firm*—Thomas N. Twomey; J. Gordon Lewis

[57] ABSTRACT

An electric motor/pump system which minimizes physical size. The electric motor consists of a pot-shaped housing whose open end is sealed by a plate. The pump consists of an essentially rectangular block in whose middle plane holes are drilled for pump pistons. The plate features a base plate and also ramp-like edges. The pump block features a recess. During assembly of electric motor and pump, the base plate of the plate is located in the recess of the pump block.

5 Claims, 1 Drawing Sheet

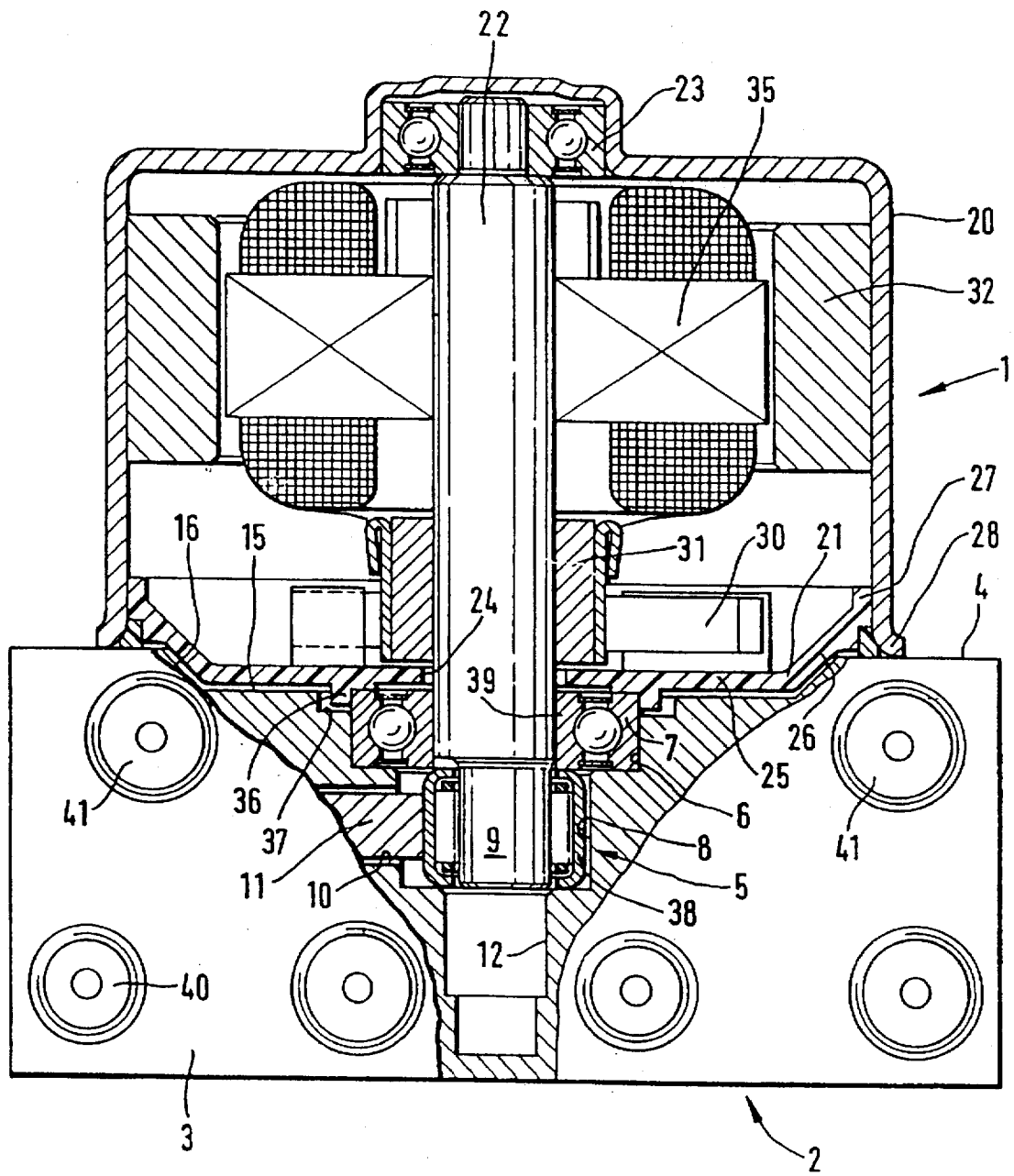

1

ELECTRIC MOTOR, PUMP AND AN ELECTRIC MOTOR/PUMP SYSTEM

TECHNICAL FIELD

The invention pertains to an electric motor, a pump and also to a motor-pump assembly.

BACKGROUND OF THE INVENTION

An electric motor of this kind is described in German application No. DE-OS 4,235,962. It is used in particular to drive an axially flanged hydraulic pump. The hydraulic pump is located in a housing that features a flat flanged side. Accordingly, the outer side of the plate is of flat design, so that during assembly of electric motor and pump, the upper housing and the plate rest flush against each other. In this case, the pot-shaped housing runs up to the flanged surface of the pump housing. The electric motor housing consists of a magnetically conductive material that serves to contain the magnetic field lines of the permanent magnets located in the motor.

The invention solves the problem of obtaining the shortest possible size of the motor housing, which consists of magnetically conductive material, with respect to the length of the rotor. Therefore it is proposed that the plate consists of a flat base plate, in whose center there is a passage for the shaft, and an edge region that slants outward from the base plate and at whose outer edge the perimeter collar is formed, whereby, when the plate is connected with the housing, viewed in the axial direction, the base plate is located in front of the edge of the pot-shaped housing.

From the DE-OS 4,235,962 we also know that the brushes which contact the commutator of the electric motor are located on the inside of the plate. Continuing the idea of the invention, it is proposed that the diameter of the base plate be somewhat larger than the region in the radial direction filled by the brushes. Thus the brushes can be located on the base plate. At the outside of the base plate there is a mount consisting preferably of a perimeter span that protrudes axially from the outer surface of the base plate, with the span enclosing an inner diameter corresponding to the outer diameter of the main bearing. In another embodiment of the electric motor, the plate can likewise be provided with a perimeter span whose outer diameter corresponds to a hole that corresponds to the diameter of a receiving hole in the pump housing.

Both methods make it possible to attach the plate, and thus the motor housing, to the flanged surface of the pump housing radially.

The electric motor described above is provided in particular for a pump housing which is described in WO94/08830. This pump housing consists of an essentially rectangular block that features a blind hole opening into a flanged surface into which the shaft of an electric motor can be inserted. In a middle plane perpendicular to the receiving hole there are other holes for pump pistons, and housing channels run in planes above and below the middle plane; said channels lead to valves, connectors and/or reservoirs situated in these planes.

The height of the block, that is, its size in an axial direction relative to the receiving hole, is determined by the diameter of the hole for the pump piston, and also the installation space for the connections, the reservoir and valves. The object is to keep the installation height of the block as small as possible and in particular, to keep the installation height of the system, consisting of the block and the electric motor attached with a flange, as small as possible. Therefore it is proposed that the flanged side be provided with a flat recess that is concentric to the receiving hole, where the diameter of the base surface of the recess is smaller than the diameter of the housing of the electric motor being attached with a flange.

On one hand, this recess results in less material being used for the pump block, and on the other hand, at least partial regions of the electric motor can penetrate into the rectangular contour of the block, so that the overall height of the pump housing and electric motor housing will be as small as possible.

Preferably the transition region between the base surface of the recess and the flanged surface of the pump housing is formed by a slanting annular surface.

In this case, the base surface of the recess is designed so that the extension of the axes of the connectors located in one plane of the pump block underneath the flanged surface run at the smallest possible tangential spacing along a circle circumscribed at the base surface of the recess.

The described electric motor and also the described pump are suitable for assembly in a motor/pump unit, and the diameter of the base surface of the recess in the pump housing and also the base plate of the plate are roughly the same. This means that the shape of the recess is adapted essentially to the outer contour of the plate.

The size of the recess in the flanged side of the pump housing is configured so that the edge of the motor housing rests against the flanged surface outside of the recess.

One additional possibility to minimize the installation height, in particular of the pump housing, consists in locating the region of the shaft, which is designed as an eccentric, at least partly within the inner ring of the main bearing in the pump housing. Thus the outer ring of a roller bearing located on the eccentric rests against the inside ring of the main bearing with an edge relocated inward. A separate buffer plate, such as is provided, for example, in utility patent DE 8,905,216.1, is not required.

BRIEF DESCRIPTION OF THE DRAWINGS

FIG. 1 shows a cross section of a motor-driven pump unit, where both the special properties of the electric motor and also the special properties of the pump are illustrated.

DETAILED DESCRIPTION OF THE PREFERRED EMBODIMENTS

The unit consists of an electric motor 1 and also a pump 2. The pump 2 is located in a block 3 which is partly cut away in FIG. 1 and is shown partly in a top view. In the center of the block there is a blind hole or receiving hole that is open toward one broad side of the block 3, whereby the electric motor is attached with a flange to this broad side. This side will be denoted below as the flanged side 4.

The blind hole 5 consists of a first step 6 in which the main bearing 7 is installed form-locked.

The second step 8 is located at the height of a plane in block 3 which contains drilled holes 10 for the pump pistons 11 of the pump 2. At the level of the second step 8 there is also an eccentric 9 against which the pump pistons 11 rest. Only one pump piston 11 is presented in FIG. 1. As a rule, opposing pistons are used. An even lower positioned, third step 12 of the blind hole 5 holds an additional bearing that is not illustrated in greater detail here. At the narrow side of the block 3 are hydraulic connections 40, and the connections 40 are connected to the pressurized side of the pump in a plane below the plane where the pump piston is located, whereas the connections 41 run above the pump piston plane to the intake side of the pump.

The flanged side 4 of the block 3 does not have an even surface, but rather features a flat recess 15 formed centrally to the receiving hole. The edge 16 of this recess runs, in the manner of a ramp, at an outward slant and thus has the shape of the surface of one segment of a conical cylinder.

The electric motor 1 consists essentially of a pot-shaped housing 20 which is open on one side. This open side is sealed by a plate 21. A motor shaft 22 is located in the axis of the pot-shaped housing 20; this shaft is seated on one side in a motor bearing 23 in the pot base, and on the other side, is seated on the main bearing 7 in the pump housing. In this case the motor shaft 22 runs through a passage 24 in the plate 21.

The plate 21 has a contour that consists of a base plate 25, with the diameter of this base plate roughly corresponding to the diameter of the base of the recess 15 in the pump housing 3.

The edge region slants upward and runs along the ramp 16 of the recess. A collar 27 is provided in the outer region of the base plate 25; the pot-shaped housing 20 of the motor can be pushed onto this collar. The edge 28 of the pot-shaped housing 20 comes to rest against the non-recessed region of the flanged surface 4.

Brushes 30 are located on the plate 21 in the vicinity of the base plate 25 and make contact with a collector 31.

Brushes 30 and/or the collectors 31 are cut by an imaginary, flat extension of the flanged side 4.

The installation height of the electric motor is determined essentially by the height of the collector 31 and also by the length of the rotor 35 and of the associated permanent magnets 32 attached to the inside of the motor housing 20.

The installation height of the block 3 is determined by the diameter of the drill holes 10, the placement of connections 40 and 41, and also by the thickness of the material between the drill holes and the connections required for the block to retain its rigidity. The space for the recess 15 is obtained by locating the connections 41 above the pump piston plane in the outer region of the block, so that the aforementioned recess 15 can be supplied, and the latter can extend into the region between the connections 41.

Since the electric motor is provided with a plate that protrudes in its central region opposite the outer edge of the housing 20 and runs into a corresponding recess 15 in the pump housing 3, the result is a smaller effective height of the electric motor. As a whole therefore, the installation height of the pump housing 3 and of the electric motor 1 is reduced.

The plate 21 has at its outer surface a perimeter span 36 running concentrically to the axis; the inside diameter of this span corresponds to the outer diameter of the main bearing. The span 36 extends into an annulus 37. The main bearing 7, which is located in the first step 6, extends into the annulus 37, so that the outer ring of the main bearing 7 is surrounded by the span 36. In this manner the plate 31 and thus the electric motor housing 20 are attached to the main bearing 7. Since the main bearing 7 is fixed in place radially in the pump block 3, a central alignment of the electric motor housing 20 is achieved. At the same time, this means that the span 36 holds the main bearing 7, so that it first can be attached to the plate 21, allowing a functional motor to be obtained without the electric motor being connected to the block 3; said motor can be tested independently of the pump 2. The main bearing 7 is installed into the first step 6 with the assembly of the electric motor 1 to the block 3.

The alignment of the electric motor housing 20 to the motor block 3 can also be implemented if the outer diameter of the span 36 corresponds to the outer diameter of the annulus 37.

As is indicated in FIG. 1, the region of the shaft 22 which is designed as eccentric 9 begins within the main bearing 7. This means that the outer ring 38 comes to rest against a roller bearing at the eccentric 9 at the inner ring 39 of the main bearing 7. The advantage of this is that a separate buffer plate is no longer needed. This also contributes to reducing the installation length of the motor/pump unit.

We claim:
1. Electric motor for a pump, comprising:
    a pot-shaped housing,
    a shaft located in the housing,
    a plate sealing off an open end of the housing,
    wherein the plate includes a collar portion having a passage through which extends the shaft, said collar surrounding the outer edge of the plate, onto which the housing is located,
    wherein the plate further includes a flat base portion in whose center there is a passage for the shaft, and also includes of an edge portion that protrudes at a slant outward from the base portion and at whose outer edge the collar is formed, wherein the inner side of the plate, brushes are provided which contact a collector at the shaft, with the diameter of the base plate being larger than the region filled by the brushes in a radial direction.

2. Electric motor according to claim 1, further including a mount provided on the plate for a main bearing.

3. Electric motor according to claim 2, wherein the mount is formed from a perimeter span that protrudes from the outer surface of the flat base portion of the plate, and whose inner diameter corresponds to the outer diameter of the main bearing.

4. Pump housing to which a flanged electric motor can be attached, comprising:
    an essentially rectangular block having a blind hole opening into a flanged surface into which the shaft of an electric motor is inserted, wherein said rectangular block includes a plurality of holes for pump pistons and housing channels,
    a flat recess formed at the flanged side of said rectangular blocks, wherein the perimeter of this recess is located within the flanged surface of said rectangular block, wherein a transition region between a base surface of the recess and the flanged surface of the pump housing is formed by a slanting ring surface.

5. A pump housing according to claim 4, wherein the diameter of the base surface corresponds to the diameter of a base plate of the electric motor to be attached with said flange.

* * * * *